May 20, 1958 J. F. MANTING 2,835,085
MAGNETIC DIAL FEEDER

Filed Nov. 21, 1955 5 Sheets-Sheet 1

INVENTOR.
Jack F. Manting
BY
Frank E. Liverance, Jr.
Attorney

INVENTOR.
Jack F. Manting
-BY-
Frank E. Liverance, Jr.
Attorney

May 20, 1958  J. F. MANTING  2,835,085
MAGNETIC DIAL FEEDER

Filed Nov. 21, 1955  5 Sheets-Sheet 4

INVENTOR.
Jack F. Manting
BY
Frank E. Liverance, Jr.
Attorney

United States Patent Office 2,835,085
Patented May 20, 1958

2,835,085
MAGNETIC DIAL FEEDER

Jack F. Manting, Big Rapids, Mich., assignor to Hanchett Magna-Lock Corporation, Big Rapids, Mich., a corporation of Michigan Application November 21, 1955, Serial No. 548,002

8 Claims. (Cl. 51—215)

The present invention relates to a magnetic dial chuck feeder mechanism for the very rapid and effective continuous feeding of piston rings or similar rings between grinding wheels which continuously operating at high speed, serve to simultaneously grind the opposite sides of the castings. The ring castings are placed in an inclined elongated carrier chute therefor and move down it by gravity and under the influence of such vibration as may occur in the operation, the lowermost castings being successively taken from the chute and held on the face of a magnetic chuck, circular in outline. The castings are carried in succession upwardly to horizontal guides by which such castings are moved in rapid succession to and between the grinding wheels. The castings are forced through the grinding wheels by the pressure of the castings back of them which follow one after the other, the ring castings being moved between the grinding wheels by reason of the fact that those magnetically held on the face of the magnetic chuck will, due to the turning movement of the chuck, press against the ring castings in the guides going to the grinding wheels, thus keeping the castings moving steadily and continuously between such grinding wheels.

In my invention the ring castings, in order to separate from the face of the chuck against which they have been magnetically held, have such magnetic attractive force diminished so that the separation of the castings, one after the other, from the chuck on entering the guides to the grinding wheel is rendered much easier than it would be if the full magnetic force of the chuck on such castings was maintained at all times. Furthermore, when a ring casting is brought to the face of the chuck, at the lower end of the delivery chute therefor, the magnetic attraction at such lower end of the delivery chute is decreased as otherwise the lines of magnetic force would extend too far, passing through the lowermost ring casting and to those above as they successively come to the face of the chuck against which they are held. Otherwise the tendency of two or more of the lowermost ring castings in the delivery chute to magnetically cling together would result in serious difficulties.

My invention, therefore, has for its object and purpose a very greatly improved and exceptionally rapid delivery of the ring castings to the grinding machine which process the same when passing therethrough, increasing quantity production of the processed castings delivered from the grinding machine many times over what has been previously attained.

An understanding of the invention may be had from the following description, taken in connection with the accompanying drawings, in which, Fig. 1 is a perspective view showing the magnetic feeding chuck as it is used in continuously feeding and delivering ring castings to a grinding machine.

Like reference characters refer to like parts in the different figures of the drawings.

Figure 1:
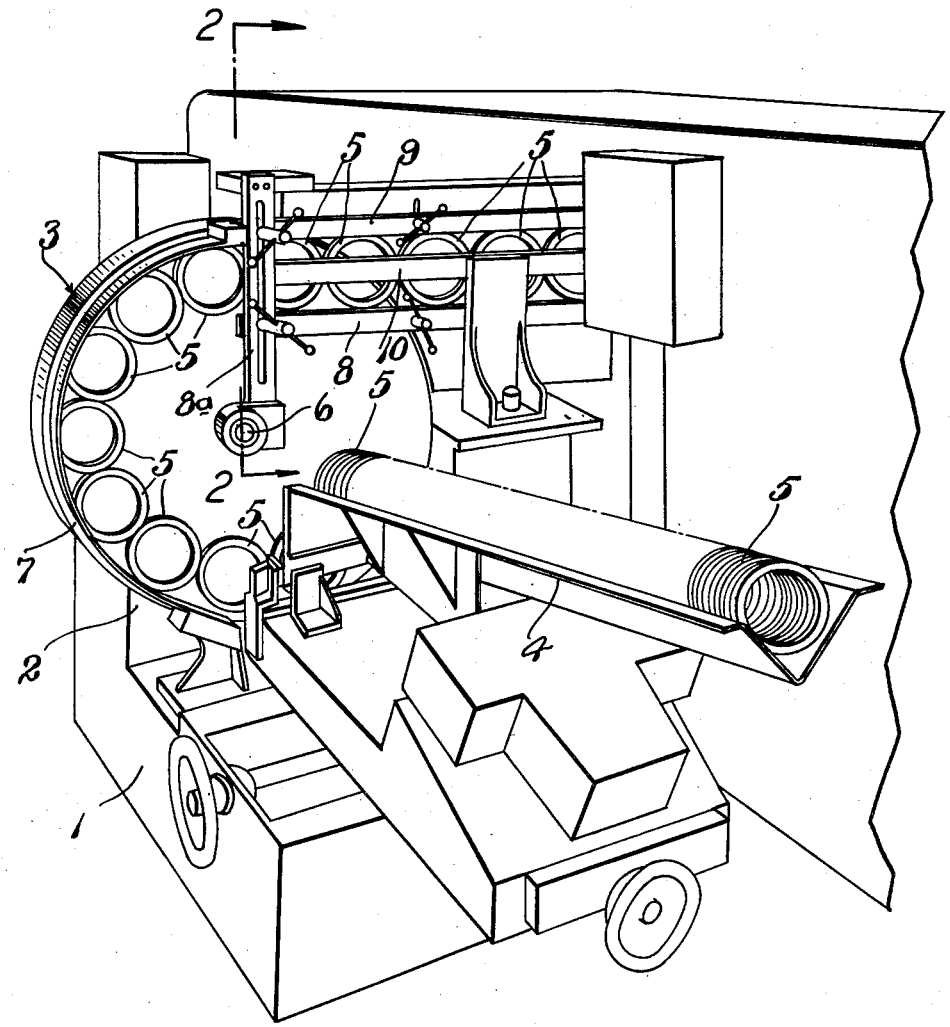

In the structure illustrated as a preferred form embodying my invention, a heavy supporting base 1 at its rear has an upwardly extending vertical supporting post 2. The magnetic chuck, indicated as a whole at 3, is located above the base 1 and in front of its vertical support 2. A downwardly and rearwardly inclined generally V-shaped chute 4 extends upwardly and forwardly having its lower end adjacent to the face of the chuck 3 and spaced a short distance from such face, being suitably carried and supported upon the base 1 of the machine and adjustable toward and away from the face of the chuck 3 for different thicknesses of ring castings. The ring castings 5 are located in the V-shaped chute or trough 4 and moved down it by gravity, the lowermost casting in the chute coming to the outer face of the chuck so that such lowermost ring castings, one after the other, coming into the field of magnetic attraction are taken from the chute and carried by the chuck in a clockwise direction, being held securely against the outer face of the chuck until they reach the entrance end of the guides which carry the castings to a grinding machine.

The magnetic chuck is mounted to turn about a horizontal axis, being secured to a horizontal shaft 6 (Fig. 2) mounted for rotation at the upper end of the vertical post 2. Such shaft 6 may be continuously driven in any suitable manner. The chuck turning in a clockwise direction, the lowermost castings 5 (Fig. 1) will b magnetically held at the outer face of the chuck and adjacent to its peripheral portions, and as shown in Fig. 1, be carried to the upper portion of the chuck. A retaining guard 7 of curved form as shown in Fig. 1 insures that such ring castings will not be positioned outwardly beyond the position of such guard and also that the uppermost ring casting will be guided to the entrance end of the guides which carry them in succession to the grinding wheels.

Figure 5:
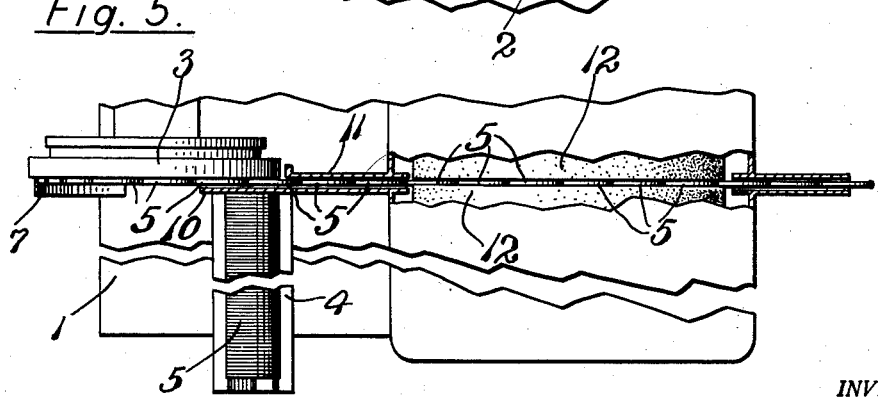
Fig. 5 is a plan view of the magnetic chuck structure and the grinding wheels between which the ring castings are passed, some parts broken away and shown in section for a better disclosure.

Such guides consist of spaced horizontal bars 8, 9 and 10 (Fig. 1) and a back 11 (Fig. 5). The bars at their outer ends may be mounted on a fixed bar 8a, the lower bar 8 and the upper bar 9 being adjustable with respect to each other for different diameters and for different thicknesses of ring castings which ride upon the upper edge of the lower bar 8 and underneath the lower edge of the upper bar 9. The bar 10 is at the outer side of the ring castings as shown in Fig. 1 substantially midway between the lower and upper bars 8 and 9 as in Figs. 1 and 2. The horizontal guide for the ring castings is completed by back plate 11 (Fig. 5) between the chuck and grinding machine.

The guides for the ring castings carry them to and between two rotatably driven grinding wheels 12, the adjacent faces of which are spaced predetermined distances apart so that when the castings 5 are moved between them they are ground at opposite sides predetermined and substantially exact amounts. They enter at one side of the grinding machine and pass out at the opposite side, as in Fig. 5.

In the structure of the magnetic dial chuck 3, a central hub 13 (Fig. 2) is keyed to the driven shaft 6. To it a circular or disk body is secured including an inner web 14, a sleeve 15 integral therewith which is fixedly secured to the hub 13 and an outer annular rim 16, there being between sleeve 15 and the rim 16 a space which is divided into sectors by spaced radial partitions 17 (Fig. 3) thereby providing a plurality of chambers open at their outer sides around the chuck body.

Figure 2:
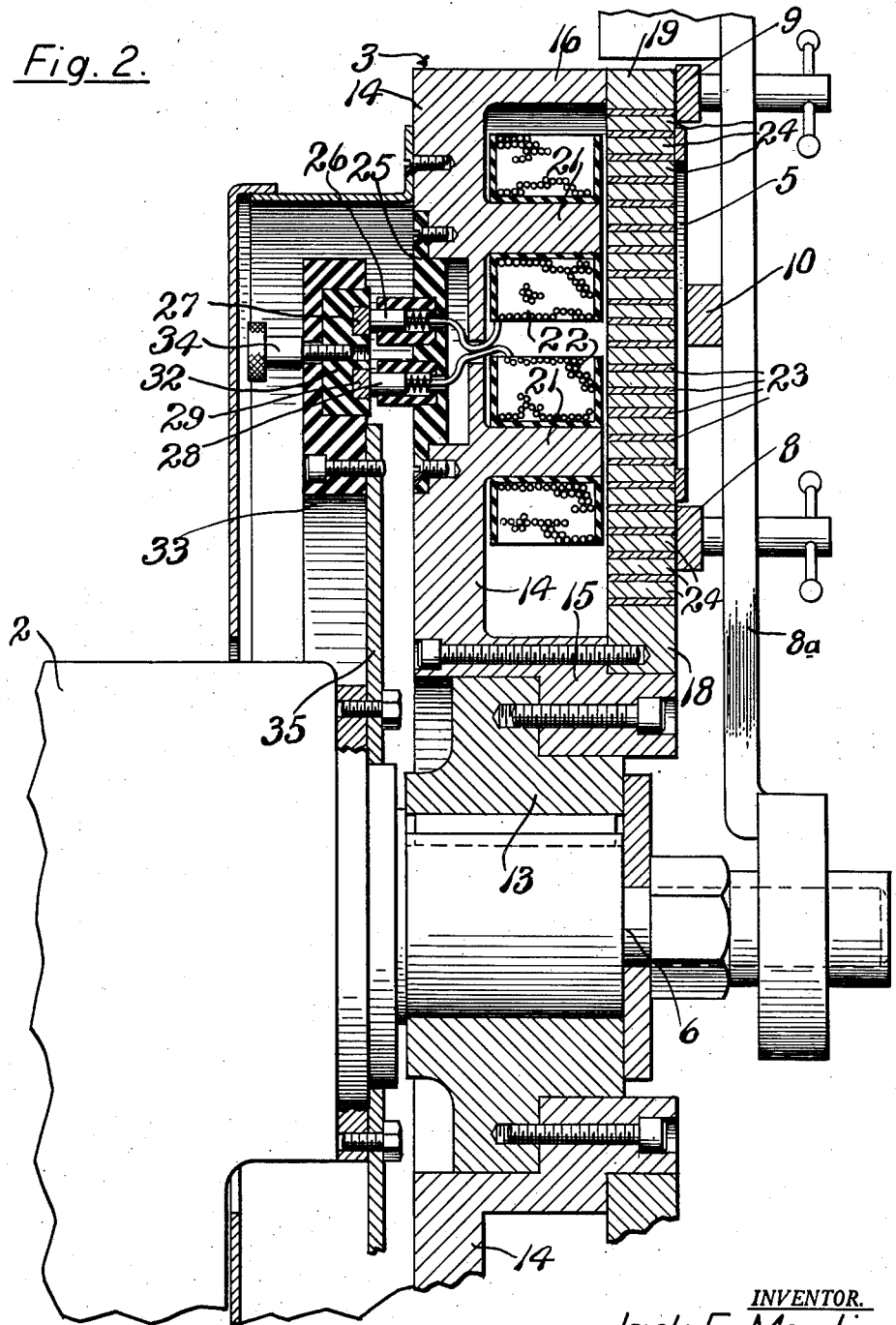
Fig. 2 is a fragmentary enlarged vertical section from front to rear through the upper portion of the magnetic chuck structure used with my invention.

At the outer side of the body described a chuck face is secured, covering said chambers, including an inner ring 18, an outer ring 19 and spaced radial members 20 connecting them (Fig. 3), one over each of the previously described partitions 17. This face member is fixedly secured to the body of the chuck by screw connections as shown in Fig. 2. The chambers are covered by laminated sectors including alternate laminations 23 and 24 of suitable material. The outer edges of said laminations and of the inner and outer ring 19 are in a common horizontal plane. It is against the outer edges of such laminations that the ring castings 5 are held.

Figure 3:
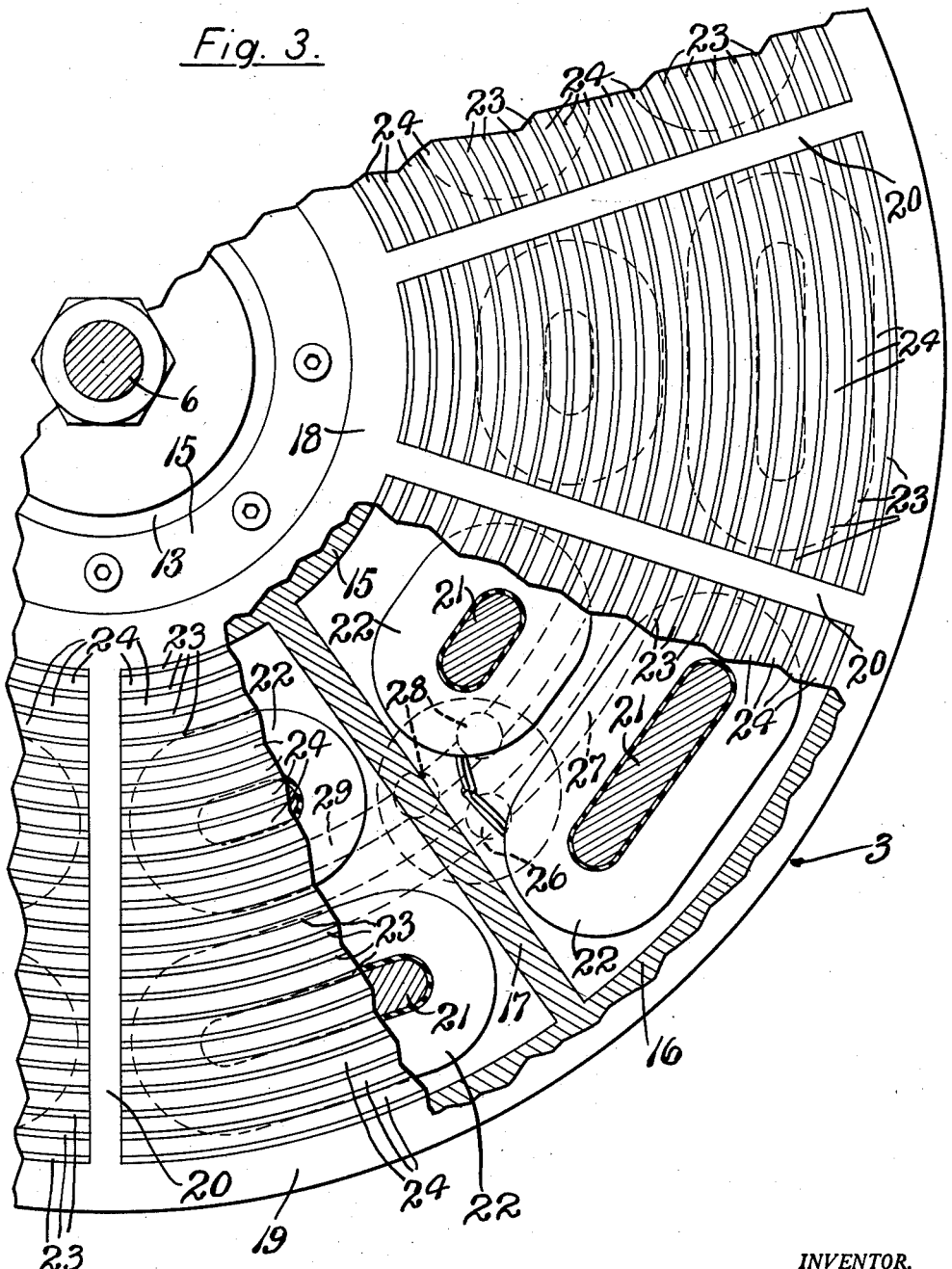
Fig. 3 is a fragmentary front elevation of the chuck structure, parts being broken away and shown in section for better disclosure.

Within the radial chambers electromagnets are located, each having a core 21 and windings 22. Such magnets are disposed in two circular series, one within the other as shown in Fig. 3. When current passes through the windings the chuck will magnetically hold the ring castings against its face with a force dependent upon the strength of the current passing through such windings.

Figure 4:
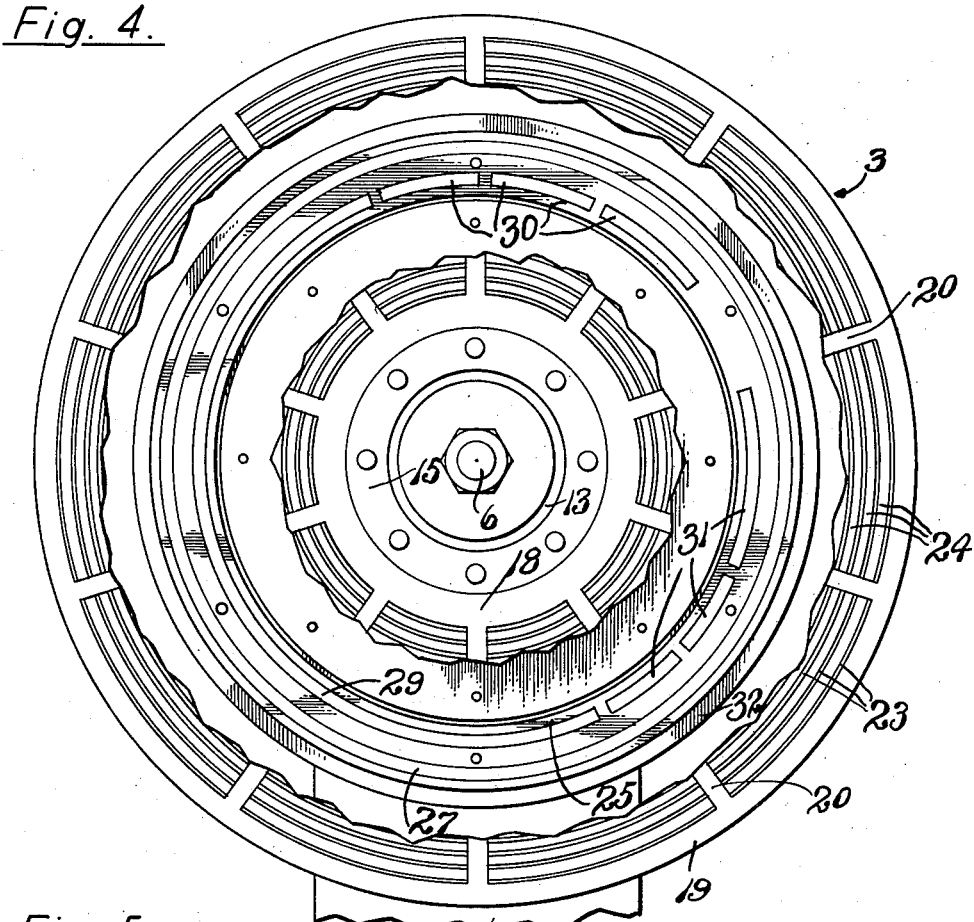
Fig. 4 is a front elevation of the magnetic chuck used with my invention with parts broken away to show the interior structure.

At the back of the web 14 of the chuck body a ring 25 of insulating material is secured on which a contact 26 is mounted connected with one end of the windings around the cores 21 which brush or contact 26 is spring pressed at its outer end against a circular metal collector ring 27. Additionally, to brush 26 two brushes or contacts 28 spaced a short distance from each other are mounted on the insulating ring 25 and at their ends ride upon the collector ring sectors 29, 30 and 31 (Fig. 4). A brush 26 and a pair of brushes 28 are provided for each pair of radially aligned elecromagnets so that the magnets in each pie-shaped sector of the chuck are separately energized. The continuous ring 27 and the ring sectors 29, 30 and 31 are concentric. The sector 29, nearly 180 degrees in length, at its ends is spaced short distances from the adjacent sectors 30 and 31 while such sectors 30 and 31 at their adjacent ends are similarly spaced. The gaps however between said sectors are less than the spacing between the brushes 28 (Fig. 3) so that when passing over such gaps one brush momentarily, for example, will reach the first sector 30 while the other will be upon the long sector 29. And likewise in passing over all gaps there will be a momentary bridging of the gaps by the brushes 28 except at the adjacent ends of the sectors 30 and 31 nearest to each other.

The ring 27 and the sectors 29, 30 and 31 are fixed in position against rotative movement. They are carried by a base 32 of insulating material adjustably mounted upon a ring 33 of insulating material, such adjustment being provided by the screw 34 threaded into the base 32 and bearing against the ring 33, as in Fig. 2, in order to maintain contact between ring 27, and sectors 29, 30 and 31 and the brushes 26 and 28. The carrying ring 33 in turn is secured to a fixed plate 35 mounted on the supporting post 2 as shown in Fig. 2, back of the rotatable chuck.

Alternating electric current, which is substantially universal today, is changed by a rectifier at 36 (Fig. 6) to direct current. It may flow through the circuit wire 37 from one side of the rectifier and return through the return wire 38. Interposed between and connecting the wires 37 and 38 is a resistance 39 forming a part of a rheostat. Between the rheostat and the rectifier a resistance 40 is interposed in the return wire as shown.

The outlet wire 37 is connected by a branch wire 41 with the continuous collector ring 27. The long sector 29 concentric with and within the ring 27 is connected with the return wire 38 by a wire 42.

Figure 6:
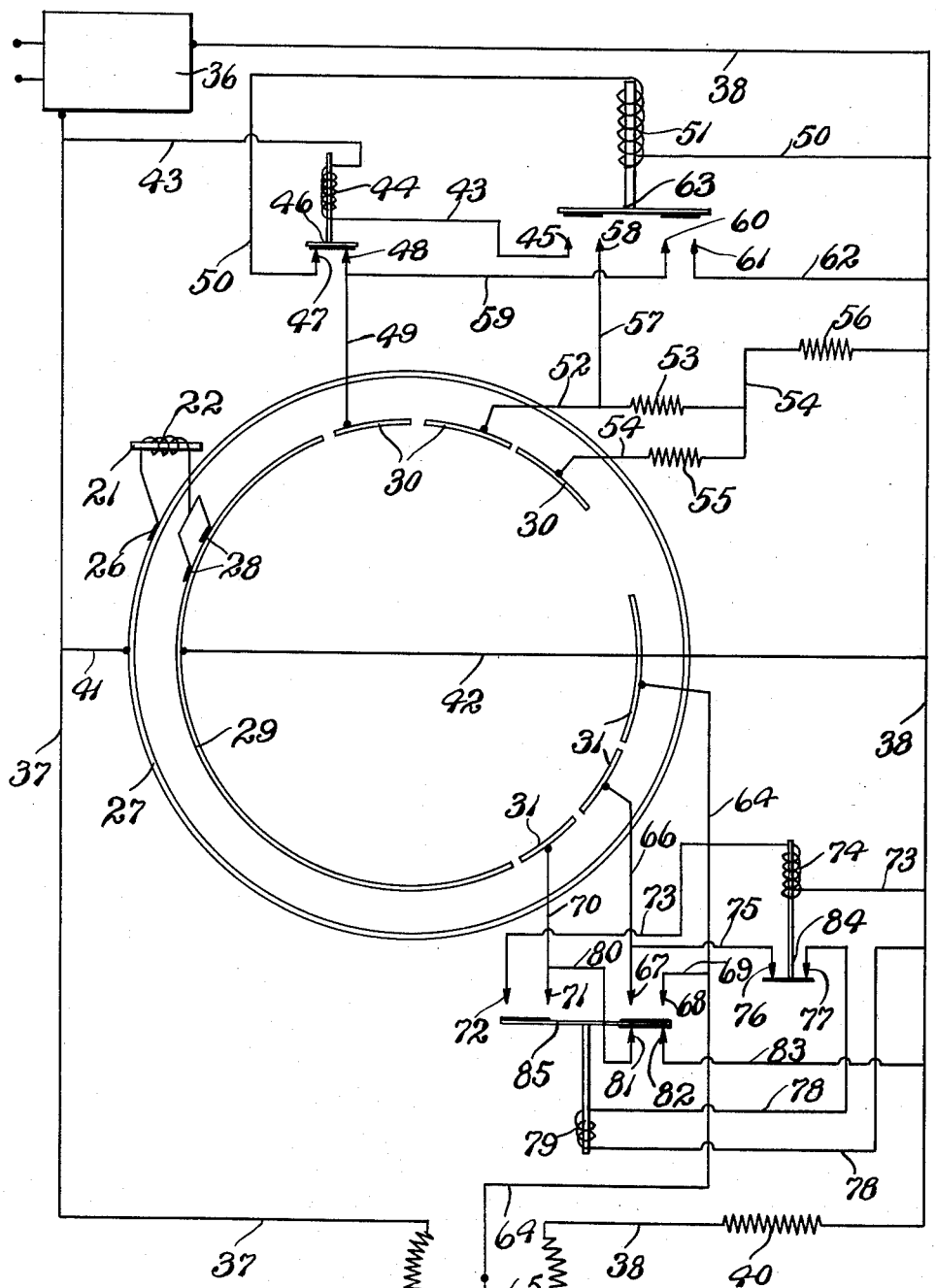
Fig. 6 is an electric wiring diagram such as used in connection with my invention.

From the outlet wire 37 a branch wire 43 having interposed in the length thereof a solenoid winding 44 leads to a contact 45. The armature of the solenoid 44 has a switch at its end which in one position, as shown in Fig. 6, bridges and connects two contacts 47 and 48. From one of the contacts 48 a wire leads to the first of the short, arcuate sections 30 which have the same radius of curvature as the long section 29. From the other contact 47 a wire leads to the return wire 38 having interposed therein a second solenoid winding 51.

From the second short section 30 away from the adjacent end of the long ring section 29, a wire 52 having a resistance 53 therein leads to and connects to a wire 54 between two resistances 55 and 56 in such last mentioned wire, the wire 54 at one end being connected to the ring section 30 farthest from ring section 29 (Fig. 6) and the other end to the return wire 38.

The resistances 53, 55 and 56 each have different values such for example as 500—1000 ohms for resistance 53, 1000—1500 ohms for resistance 55 and 500 ohms for resistance 56. This results in a current value in the second section 30 different from that in the first section 30 and a further difference in current value in the third section 30. The value is a decreasing one clockwise.

Between the second of such arcuate sections 30 and the resistance 53 a wire connected with the wire 52 leads to a contact 58 spaced a short distance from the previously described contact 45. From the wire 49 between its ends wire 59 leads to a contact 60 associated with which is a spaced contact 61 from which a wire 62 leads to the return wire 38.

With the magnetic chuck turning in a clockwise direction and with brush 26 always in electrical engagement with the ring 27 and the spaced brushes 28 bearing against the longer section 29 current from the rectifier through wires 37 and 41, ring 27 and the electromagnet windings 22 around the cores 21 and going through brushes 28 to the long curved section 29, will return through wire 42 and thence through the return main wire 38. Thus when brush 26 is against collector ring contact 27 and both brushes 28 against the long section 29, the full magnetic attraction is exerted on the ring castings 5 holding them with the greatest force attainable, there being no diminution of the magnetic attraction by reason of the reduced current from resistances in the circuit which the electric current follows. And as the ring castings will come over the lower portion of such longer arc section 29 shortly after being delivered from the delivery chute 4 during the movement of such ring castings from lowermost position to nearly uppermost position a number of such castings will be very strongly, magnetically connected and associated with the rotating chuck.

The rotating magnetic chuck carrying the brushes 26 and 28 with it will reach the upper end of the long sector 29 and the inner brushes 28 will momentarily bridge the gap between the upper end of said sector 29 and the adjacent end of the first reached short sector 30. This bridging of the gaps between adjacent sectors 29, 30 and also, as hereafter described, of the other sectors 31 eliminates undesirable arcing. As soon as the first brush 28 and afterward when both brushes have passed the gap so as to bear against the first sector 30 reached thereby, the armature of the solenoid 44 being in the position shown in Fig. 6, current will pass from the ring 27 through the brushes to the first sector 30, thence through wire 49 and from contact 48 to contact 47, thence through the wire 50 and solenoid 51 to the return wire 38. Such passage of current energizing the solenoid winding 51 will move its armature so that contacts 45 and 58 are connected, as are also contacts 60 and 61, whereupon a completion of the circuit which includes the solenoid winding 44 will occur and the electrical connection between the contacts 47 and 48 be broken, those between 45 and 58 and 60 and 61 being closed. The current will thereafter pass from the second and the third arcuate sectors 30 in succession to the wires 52 and 54 back to the return wire 38 and that from the first sector 30 when contacts 47 and 48 are disconnected back to the return wire 38 through the wires 49, 59 and 62. With the second and third sectors 30 having the brushes 28 come thereto, there will be return through the wires 52 and 54, current amperage being reduced by resistances 53, 55 and 56 so that the magnetic attraction of the uppermost ring castings as they come to the point of delivery of the guides 8, 9 and 10 is greatly reduced so that they leave the magnetic chuck easily and readily. If the full magnetic force was exerted when moving from upper to lower positions such separation would be uncertain and inefficient and in many cases not properly obtained.

As is obvious from the spacing of the dual brushes 28, they bridge the gaps between the sections 29 and 30 and between the several sections 30. Thus, as they pass from the long section 29 to the first section 30 and thereafter as they pass from one section 30 to another, there is never a complete interruption of current and the tendency to arc is materially reduced.

As soon as the leading one of the brushes 28 makes contact with the first section 30, the solenoid 51 will be activated to close the relay 63 thereby causing relay 46 to open. The opening of relay 46 deenergizes solenoid 51 and relay 63 opens and relay 46 closes. The opening and closing of relays 46 and 63 continues as a rapidly repeated operation until the second or trailing one of the brushes 28 breaks contact with the first section 30.

The operation of the relays 46 and 63 causes the current in the first section 30 to pulsate, reducing the incidence of arcing. This pulsation produces alternate current values of zero and that equivalent to the current value of the main section 29. In the second section 30, while one of the brushes 28 maintains contact with the first section 30, it causes the current value to fluctuate rapidly since it is at full value when relay 63 is closed and is reduced by the resistances 53 and 56 when the relay 63 is open. Once both brushes 28 are in contact with the second section 30, pulsation of the current will cease but its value will be reduced by the resistances 53 and 56. This will continue until the trailing brush 28 breaks contact with the second section 30. Thereafter the value of the current will again be reduced because of the combined higher resistance values of the resistances 55 and 56. Each radially extending pair of electromagnets passes through this cycle individually since each pair has its own set of brushes 26 and 28.

The result of this arrangement is a progressive reduction of the intensity of the field produced by the electromagnets. The long gap between the last section 30 and the first section 31 results in deactivation of the electromagnets and is so located in the structure that the electromagnets are inoperative between delivery of the rings 5 to the guides formed by the bars 8, 9 and 10 and the point where a new ring is selected from the chute 4.

The wiring at the lower right hand portion of Fig. 6 is to control the decreased magnetic attraction potentiality of the chuck as a ring casting is taken from the lower end of the chutes and is moved in a clockwise direction from its place of delivery to the chuck to the place where it is delivered from the chuck to the guides leading from the grinding machine. As shown in Fig. 1 delivery from the chute 4 is to the right hand side of the vertical plane of the chuck disk.

The first of the sections 31 reached by the dial chuck as it is turned in clockwise direction is connected by wire 64 with the movable lever 65 which is adapted to be moved to different positions on the rheostat resistance 39. The next or middle section 31 has a wire 66 connected thereto terminating in a contact 67 which is paired with an adjacent contact 68 from which a wire 69 leads to and connects with the wire 64. The third sector 31 nearest to the long arcuate sector 29 has a wire 70 connected thereto which leads to a contact 71 spaced from and paired with a second contact 72 from which a wire 73 leads to the return wire 38 of the circuit having interposed in the length thereof a solenoid winding 74. A wire 75 is connected with the wire 66 and leads to a contact 76 spaced from and paired with a second contact 77 from which a wire 78 leads to the circuit return wire 38 with a second solenoid winding 79 interposed in the length thereof. From the wire 70 a branch wire 80 leads to a contact 81 spaced from and paired with a second contact 82 with wire leading therefrom to the main circuit return wire 38.

With the solenoid winding 74 an armature 84 is associated which has a bridge at its end which electrically connects the contact 76 and 77. The armature associated with the solenoid winding 79 at its end carries two bridges, one of which will electrically connect the contacts 72 and 71 and simultaneously connect the contacts 67 and 68. In normal position as shown in Fig. 6 it bridges between and connects the contacts 81 and 82.

It is evident that the current initially passing from the collector ring 29 and the brushes 26 and 28 when the contacts reach the first section 31 will close a circuit through the wires 64, lever 65, resistance 39, return wire 38 and its interposed resistance 40 and that such current will be of greater or less amperage depending upon the position of the rheostat 65, increasing in amperage with the increase in current as lever 65 is turned to the right and decreasing as it is turned to the left.

Upon the brushes 28 contacting the next succeeding section 31, the middle one in Fig. 6, a circuit is made from main wire 38 through wire 78, the connected contacts 76 and 77, wire 75 and wire 66. Such circuit is instantly broken by the action of the solenoid at 79 which moves the bridging bar 85 to connect contacts 67 and 68 and 71 and 72 whereupon current passes from main wire 38, to wire 64 through resistance 39, wire 69 and wire 66 through connected contacts 67 and 68. Also the contacts 71 and 72 are connected to make a completed circuit where brushes 28 reach the last of the three sectors 31, connecting wires 70 and 73, the latter being joined with main wire 38. The solenoid winding 74 will act to break the circuit between the contacts 76 and 77, thus breaking the circuit between the middle sector 31 and ring 27. After brushes 28 leave the last sector 31, the circuits having the first and middle sectors are broken and direct flow of current from wire 38 through wire 42, brushes 26 and 28 and coils 22, ring 27, wire 41 and wire 37 takes place. The magnetic attraction of the chuck to the lowermost ring casting in the feeding chute or trough 4 is lowest when the lowermost casting is taken from the trough and increases until it reaches the long sector segments 29, all of the ring castings which are passing thereover are most strongly held on the chuck until the upper segments 30 are successively reached by the brushes 28, whereupon the magnetic force is decreased as previously described. The magnetic attraction of its lowest extent or degree directly at the lower delivery end of the chute 4 is increased until the greatest magnetic attraction is exerted against the ring castings as they pass over long segment 29 and is decreased when passing over the segments 30 while in the gap between the end segments 30 and 31 no magnetic force is exerted to hold the ring castings in operative engagement with the chuck. This results in the lowermost ring casting in the delivery chute being magnetically connected with the chuck but with the attraction of an extent and degree that the ring casting next back of the lowermost one is not materially affected. It will become so only when the lowermost ring casting has been delivered from the chute and the next succeeding ring casting moves into the place of the lowermost one, thereupon becoming the lowermost ring casting in the chute and is subjected to the magnetic attraction of the chuck. As such lesser degree of magnetic attraction would not be sufficient or practical or operative with the rotation of the chuck the force of attraction is stepped up to its maximum and holds through nearly 180 degrees rotation of the chuck or until the castings come to or over the upper segments 30, the attractive force diminishing and decreasing so that the ring castings in succession are effectively delivered to the guides which lead to the grinding machine, such guides being provided by the bars 8, 9 and 10 and the backing plate at 11.

With the structure described a very efficient feeding of the ring castings to the grinding machine is attained. The speed of operation is such that it will take two attendants at least at all times to keep ring castings supplied to the delivery chute 4, the production of ring castings processed by grinding opposed sides thereof being many thousands per hour. The strong magnetic attraction of ring castings shortly after delivered to the chuck to a point shortly before they are taken from the chuck and moved to the grinding machine insures that those which are forced to the grinding machine will have ample moving force behind them and that the strongly attracted castings which are causing such feeding pressure will stay magnetically connected with the chuck and will not be moved over the face thereof, the strong magnetic force of the chuck in cooperation with the guard at 7 insuring correct delivery to the guides which lead to the grinding machine.

The invention is defined in the appended claims and is to be considered comprehensive of all forms of structure coming within their scope.

I claim:

1. A circular magnetic chuck having an article carrying face, means for mounting said chuck for rotation about a central axis, means for continuously supplying articles to be held on said face of the chuck, one after another, to said chuck adjacent a peripheral face thereof, to be carried by the chuck through a circular arc of movement, means for removing in succession articles carried by the chuck at the end of said arc of movement, means for automatically varying the magnetic attraction force acting on said articles as they are moved from supplying to removing positions including electromagnets carried by the chuck face, collector ring means including a continuous feed ring and a sectored ring, contact means in series with said electromagnets and rotatable with said chuck for engagement with said rings, and a plurality of resistance circuits each in series and connected with certain sectors of said sectored ring, for effecting variations in current through said electromagnets, wherein certain of the resistance circuits are alternately interrupted by relays actuated by current from the corresponding and other sectors of said sector ring.

2. The structure of claim 1, wherein the sectored ring includes an open gap effective to cut off all current to the electromagnets through a predetermined arc of rotation of the chuck and the next succeeding sector for establishing current to the electromagnets has a manually controlled resistance in series therewith for varying the effective magnetic attraction of the electromagnets during establishment of the current therethrough.

3. In a rotatable circular magnetic chuck for selecting individual magnetically attracted articles from a magazine and discharging them into a guideway, said chuck having a plurality of circumferentially spaced electromagnets and circuit means for individually energizing each of said electromagnets, the improvement in said means comprising: a ring; said ring being divided into a main segment and a plurality of short segments, said short segments being arranged in two groups, the first at one end of said main segment and the second at the other end thereof; means connecting said main segment to a source of electrical current; each of said segments being separately connected to the source of electrical current; first means connecting said first group of segments to a source of electrical current so arranged that said segments are charged with electrical current of increasing value in a direction toward said main segment; second means connecting said second group of segments to a source of electrical current of decreasing value in a direction away from said main segment; first interruption means for causing the current in the short segment of said first group adjacent said main segment to pulsate; second interruption means for causing the current in the short segment of said second group adjacent said main segment to pulsate.

4. In a rotatable circular magnetic chuck for selecting individual magnetically attracted articles from a magazine and discharging them into a guideway, said chuck having a plurality of circumferentially spaced electromagnets and circuit means including a pair of spaced contacts for individually energizing each of said electromagnets, the improvement in said means comprising: a ring adapted to be engaged and wiped by said contacts; said ring being divided into a main segment and a plurality of short segments said short segments being arranged in two groups, the first at one end of said main segment and the second at the other end thereof; each of said segments being separately connected to the source of electrical current; first means connecting said first group of segments to a source of electrical current so arranged that said segments are charged with electrical current of increasing value in a direction toward said main segment; second means connecting said second group of segments to a source of electrical current of decreasing value in a direction away from said main segment; first interruption means for causing the current in the short segment of said first group adjacent said main segment to pulsate; second interruption means for causing the current in the short segment of said second group adjacent said main segment to pulsate; said contacts being spaced apart a greater distance than the spacing between the segments of said rings whereby said contacts bridge the gap therebetween; said electromagnets when said contacts bridge the gap between the first and second short segments of said second group being energized by a continuous but pulsating current of fluctuating value.

5. In a rotatable circular magnetic chuck for selecting individual magnetically attracted articles from a magazine and discharging them into a guideway, said chuck having a plurality of circumferentially spaced electromagnets and circuit means including a pair of spaced contacts individually energizing each of said electromagnets, the improvement in said means comprising: a ring adapted to be engaged and wiped by said contacts; said ring being divided into a main segment and a plurality of short segments said short segments being arranged in two groups, the first at one end of said main segment and the second at the other end thereof; each of said segments being separately connected to the source of electrical current; first means connecting said first group of segments to a source of electrical current so arranged that said segments are charged with electrical current of increasing value in a direction toward said main segment; second means connecting said second group of segments to a source of electrical current of decreasing value in a direction away from said main segment; first interruption means for causing the current to pulsate in the short segment of said first group adjacent said main segment; second interruption means for causing the current to pulsate in the short segment of said second group adjacent said main segment; said contacts being spaced apart a greater distance than the spacing between the segments of said ring whereby the current flowing to said electromagnets is not interrupted while said contacts bridge said gap and arcing is suppressed.

6. In a rotatable circular magnetic chuck for selecting individual magnetically attracted articles from a magazine and discharging them into a guideway, said chuck having a plurality of circumferentially spaced electromagnets and circuit means for individually energizing each of said electromagnets, the improvement in said means comprising: a ring divided into a main segment and a plurality of short segments said short segments being arranged in two groups, the first at one end of said main segment and the second at the other end thereof; each of said segments being separately connected to the source of electrical current; first means connecting said first group of segments to a source of electrical current so arranged that said segments are charged with electrical current of increasing value in a direction toward said main segment; second means connecting said second group of segments to a source of electrical current of decreasing value in a direction away from said main segment; interruption means for causing the current to pulsate in the short segment of said first group adjacent said main segment.

7. In a rotatable circular magnetic chuck for selecting individual magnetically attracted articles from a magazine and discharging them into a guideway, said chuck having a plurality of circumferentially spaced electromagnets and circuit means for individually energizing each of said electromagnets, the improvement in said means comprising: a ring divided into a main segment and a plurality of short segments, said short segments being arranged in two groups, the first at one end of said main segment and the second at the other end thereof; each of said segments being separately connected to a source of electrical current; first means connecting said first group of segments to a source of electrical current so arranged that said segments are charged with electrical current of increasing value in a direction toward said main segment; second means connecting said second group of segments to a source of electrical current of decreasing value in a direction away from said main segment; interruption means for causing the current to pulsate in the short segment of said second group adjacent said main segment.

8. In a rotatable circular magnetic chuck for selecting individual magnetically attracted articles from a magazine and discharging them into a guideway, said chuck having a plurality of circumferentially spaced electromagnets and circuit means including a pair of spaced contacts for individually energizing each of said electromagnets, the improvement in said means comprising: a ring adapted to be engaged and wiped by said contacts; said ring being divided into a main segment and a plurality of short segments, said short segments being arranged in two groups, the first at one end of said main segment and the second at the other end thereof; each of said segments being separately connected to the source of electrical current; first means connecting said first group of segments to a source of electrical current so arranged that said segments are charged with electrical current of increasing value in a direction toward said main segment; second means connecting said second group of segments to a source of electrical current of decreasing value in a direction away from said main segment; said contacts being spaced apart a greater distance than the spacing between the segments of said ring and providing a continuous source of electrical current for said electromagnets as said contacts transfer from one segment to another.

References Cited in the file of this patent

UNITED STATES PATENTS

| | | |
|---|---|---|
| 1,548,563 | Spencer | Aug. 4, 1925 |
| 1,604,323 | Spencer | Oct. 26, 1926 |
| 1,628,618 | Spencer | May 10, 1927 |
| 2,657,504 | Cadman | Nov. 3, 1953 |